United States Patent
Chou

(10) Patent No.: US 6,483,686 B1
(45) Date of Patent: Nov. 19, 2002

(54) CIRCUIT FOR INDICATING ABNORMALITY OF THREE-MODE SURGE ABSORBER OF PUBLIC ELECTRIC POWER AND A MULTIPLE-END FUSE

(76) Inventor: Jonie Chou, 9F-4, No. 232, Chung Ho Road, Chung Ho City, Taipei Hsien (TW)

( * ) Notice: Subject to any disclaimer, the term of this patent is extended or adjusted under 35 U.S.C. 154(b) by 120 days.

(21) Appl. No.: 09/717,345

(22) Filed: Nov. 22, 2000

(30) Foreign Application Priority Data

Oct. 26, 2000 (TW) ........................................ 89218628 U

(51) Int. Cl.[7] ............................ H02H 1/04; H02H 3/22; H02H 85/08
(52) U.S. Cl. ................... 361/118; 361/119; 361/106; 361/111; 361/113; 337/229
(58) Field of Search ................... 361/104, 118, 361/119, 117, 106, 111, 113, 127; 337/295, 290, 189, 229, 293

(56) References Cited

U.S. PATENT DOCUMENTS

| | | | | |
|---|---|---|---|---|
| 3,735,312 A | * | 5/1973 | Nagel | 337/15 |
| 4,023,071 A | * | 5/1977 | Fussell | 361/111 |
| 5,017,756 A | * | 5/1991 | Gilliland | 219/130.32 |
| 5,357,568 A | * | 10/1994 | Pelegris | 337/32 |
| 5,526,218 A | * | 6/1996 | Yoshioka et al. | 337/31 |
| 5,548,462 A | * | 8/1996 | Uchida et al. | 361/18 |
| 5,617,284 A | * | 4/1997 | Paradise | 361/111 |
| 5,675,468 A | * | 10/1997 | Chang | 361/111 |
| 5,708,553 A | * | 1/1998 | Hung | 337/114 |
| 5,977,859 A | * | 11/1999 | Kawamura et al. | 29/623 |
| 5,999,391 A | * | 12/1999 | Lou et al. | 361/103 |
| 6,215,636 B1 | * | 4/2001 | Hellemans | 337/187 |
| 6,282,073 B1 | * | 8/2001 | Glaser et al. | 361/103 |
| 6,285,535 B1 | * | 9/2001 | Nakamura | 361/111 |
| 6,388,856 B1 | * | 5/2002 | Anthony | 333/12 |

FOREIGN PATENT DOCUMENTS

| | | | | |
|---|---|---|---|---|
| EP | 634768 A2 | * | 1/1995 | H01H/85/20 |
| JP | 5-68337 A | * | 3/1993 | H02H/9/04 |
| JP | 7-59252 A | * | 3/1995 | H02H/7/00 |
| JP | 2000-090808 A | * | 3/2000 | H01H/85/30 |

* cited by examiner

Primary Examiner—Anatoly Vortman
(74) Attorney, Agent, or Firm—Troxell Law Office PLLC

(57) ABSTRACT

A circuit for indicating abnormality of a three-mode surge absorber of a public electric power is disclosed. The circuit is serially connected between the input end and output end of a public electric power supply for indicating the abnormality of a three-mode surge absorbing device of a public power supply so as to achieve the object of indicating an obvious indication to the users. The circuit includes a first surge absorbing device, a first three-end fuse, an abnormal indication circuit, a second surge absorbing device and a second two-end fuse. Other than indicating the abnormality of the L-N, L-G, N-G surge absorbing devices, the present invention can prevent current leakage as destroys occurs in the diverse modes.

6 Claims, 2 Drawing Sheets

CIRCUIT FOR INDICATING ABNORMALITY OF THREE-MODE SURGE ABSORBER OF PUBLIC ELECTRIC POWER AND A MULTIPLE-END FUSE

FIELD OF THE INVENTION

The present invention relates to a power abnormality circuit, and especially to circuit for indicating abnormality of a three-mode surge absorber of a public electric power and a multiple-end fuse. Furthermore, the present invention provides a multiple-end fuse which is used to the circuit for indicating abnormality of a three-mode surge absorber of a public electric power.

BACKGROUND OF THE INVENTION

The general power receptacle for surge protection use metal oxide varistors or other transient/surge absorbers for suppressing surge wave. These elements will heat while absorbing surge wave, even a large surge wave may induce a short circuit. Therefore, temperature fuses or current fuses are used to prevent abnormality.

In general, the breakage of fuses is used to determine the abnormality of a surge protection indicator. However, in order to prevent the leakage current to the ground, in general, the indicator only displays the condition of the input ends of line-neutral mode while the conditions of line-ground mode and neutral-ground mode are not displayed.

Referring to FIG. 1, a circuit for indicating abnormality of a surge absorber is illustrated, which includes two surge absorbing devices 10 and 30 and an abnormal indication circuit 20. The L-N ends in the three-mode in public power supply is connected to the surge absorbing device 10 in series. The surge absorbing device 30 is serially connected between the L-G and N-G ends. The surge absorbing device 10 has a two-end temperature sensing fuse 101 capable of severing from a temperature of 139° C. and a metal oxide vairstor 102. When the metal oxide vairstor 102 has abnormality, it will heat gradually. Since it tightly presses against the two-end temperature sensing fuse 102, the metal oxide vairstor 102 will heat and finally burn off the two-end temperature sensing fuse 101 so that the surge protection indicator 202 will extinguish due to no current flowing therethrough.

The surge absorbing device 30 has two metal oxide vairstors 301 and 302 and a two-end temperature sensing fuse 303 capable of severing from a temperature of 139° C. When the metal oxide vairstor 301 has abnormality, it will heat gradually. Since it tightly presses against the two-end temperature sensing fuse 303, the metal oxide vairstor 301 will heat and finally burn off the two-end temperature sensing fuse 303, but the two-end temperature sensing fuse 101 does not break off so that the surge protection indicator 202 will not extinguish. Namely, the fault of the surge absorbing device 30 of the L-G ends can not be detected. Furthermore, When the metal oxide vairstor 302 has abnormality, it will heat gradually. Since it tightly presses against the two-end temperature sensing fuse 303, the metal oxide vairstor 302 will heat and finally burn-cut the two-end temperature sensing fuse 303, but the two-end temperature sensing fuse 101 does not burn-cut so that the surge protection indicator 202 will not extinguish. Namely, the fault of the surge absorbing device 30 of the N-G ends can not be detected.

SUMMARY OF THE INVENTION

Accordingly, the primary object of the present invention is to provide a circuit for indicating abnormality of a three-mode surge absorber and a multiple-end fuse.

Another object of the present invention is to provide a circuit for displaying abnormality of a three-mode surge absorber of a public electric power, in which a current sufficient to cut off a third end flows through a first and a second end of a two-end fuse and at the same time, the third end is cut off so that the third end is isolated from the first and second ends completely.

To achieve above objects, the present invention provides a circuit for indicating abnormality of a three-mode surge absorber of a public electric power. The circuit is serially connected between the input end and output end of a public electric power supply for indicating the abnormality of a three-mode surge absorbing device of a public power supply so as to provide an obvious indication to the users. The circuit for indicating abnormality of a three-mode surge absorber of a public electric power of the present invention includes a first surge absorbing device coupled to the line input end and the neutral input end for absorbing a surge between the line input end and the neutral input end; a first three-end fuse coupled to the first surge absorbing device and the line input end for preventing abnormality of parts; an abnormal indication circuit coupled to the first three-end fuse for indicating the abnormality of three-mode in public power supply; a second surge absorbing device coupled to the abnormal indication circuit, the neutral input end and the ground input end for absorbing a surge between the neutral input end and the ground input end; and a second three-end fuse coupled to the neutral input end and the second surge absorbing device for preventing the abnormality of parts.

The present invention further provides a multiple-end fuse, wherein at least one end is added to a two-end fuse, when a current sufficient for the two-end fuse to break out flowing through a first end and a second end of the two-end fuse, a third end or other ends are cut off so that the third end or other ends are completely isolated with the first or the second end.

BRIEF DESCRIPTION OF THE DRAWINGS

The various objects and advantages of the present invention will be more readily understood from the following detailed description when read in conjunction with the appended drawing, wherein.

DETAILED DESCRIPTION OF THE PREFERRED EMBODIMENTS

Figure 1:
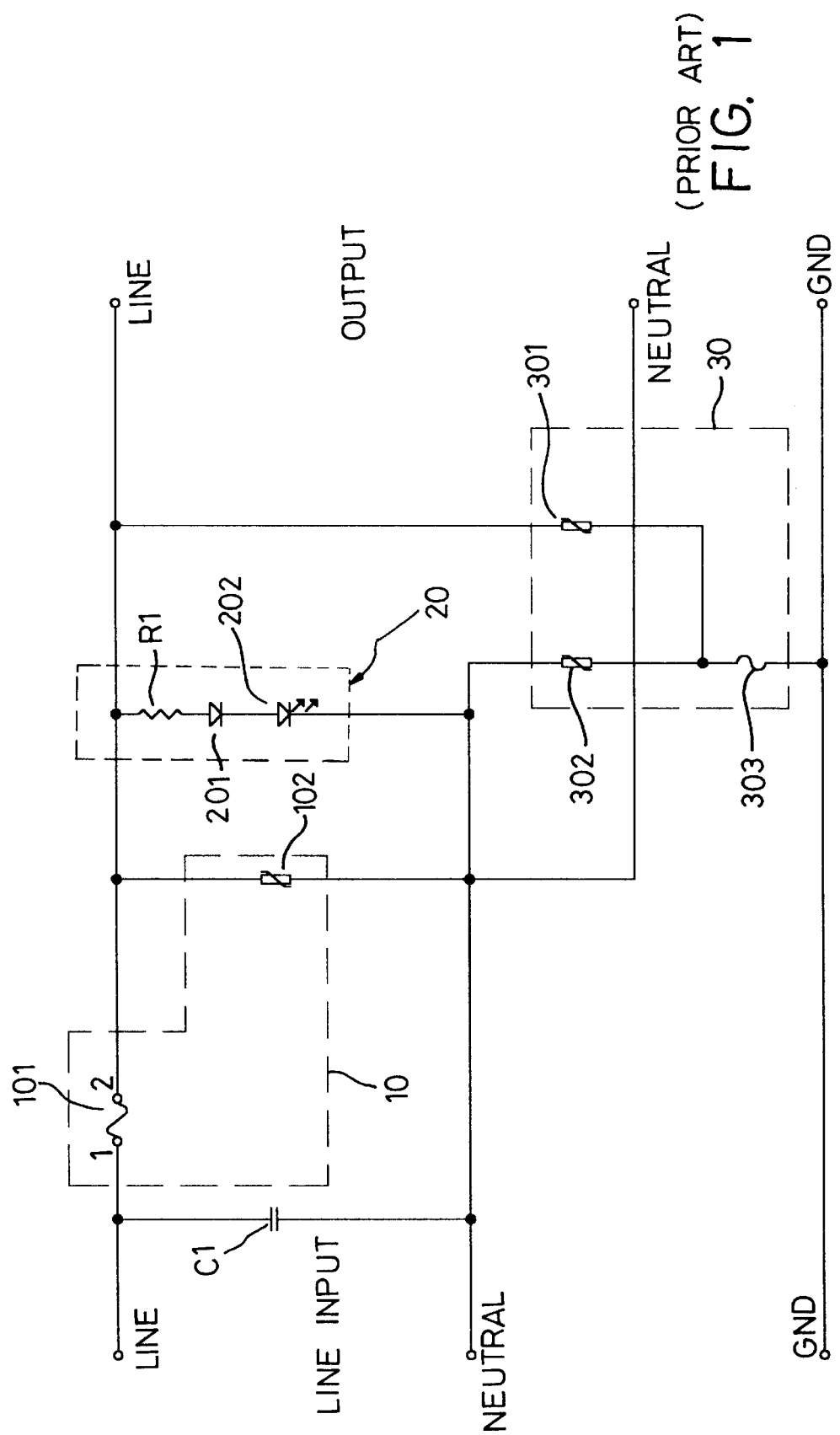
FIG. 1 shows the circuit for indicating abnormality of a surge absorber in the prior art.
Figure 2:
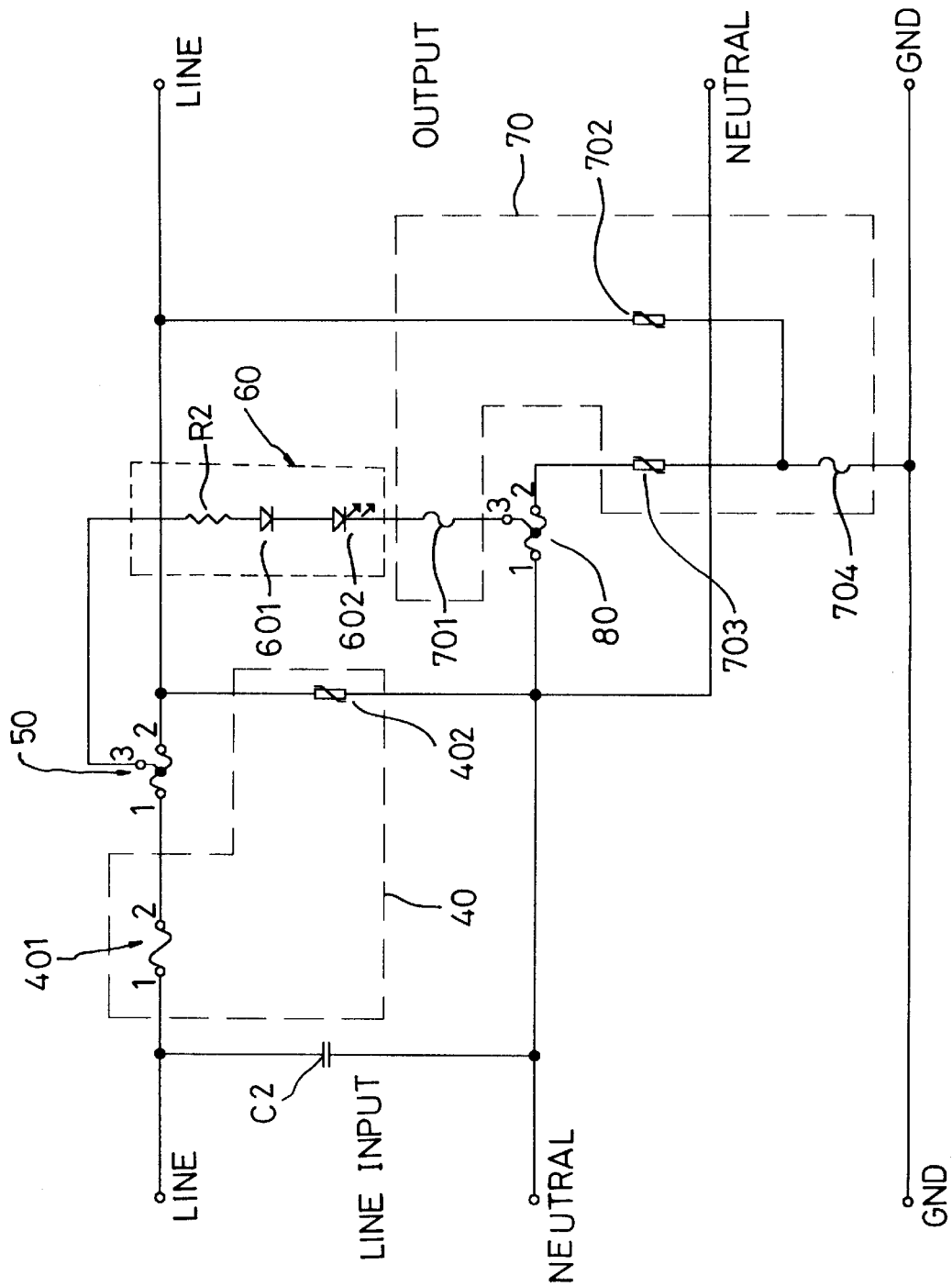
FIG. 2 shows the circuit for indicating abnormality of a three-mode surge absorber of a public electric power in the present invention.

Referring to FIG. 2, the circuit diagram of the circuit for indicating abnormality of a three-mode surge absorber of a public electric power in the preferred embodiment of the present invention is illustrated. The circuit of the present invention includes a first surge absorbing device 40, a first three-end fuse 50, an abnormal indication circuit 60, a second surge absorbing device 70 and a second three-end fuse 80. The first surge absorbing device 40 has a two-end temperature sensing fuse 401 severing from a temperature of 139° C. and a metal oxide varistor 402. The first three-end fuse 50 and the second three-end fuse 80 have a plurality of ends, because which one or more ends are further added to the two-end fuse. When a current sufficient to burn off the two-end fuse flows through the first end and second end of two-end fuse, the third end or these ends are cut so that the third end or these ends are isolated with the first and second ends completely. The abnormal indication circuit 60 includes a resistor R2, a diode 601 and a light emitting diode 602 for indicating the, abnormality of the three-mode circuit. The surge absorbing device 70 is a two-end temperature sensing fuse 701 capable of severing from a temperature of 100° C., a two-end temperature sensing fuse 704 capable of severing from a temperature of 139° C., and two metal oxide varistors 702, 703.

The operation of the circuit for indicating abnormality of a three-mode surge absorber of a public electric power according to the present invention may be analyzed by the following two modes (1) The transient/surge absorber is heated and then is destroyed gradually, and (2) The transient/surge absorber is subjected to a high voltage and is destroyed instantly. In the following, the properties of these two modes are analyzed.

(1) The transient/surge absorber is heated and then is destroyed gradually.
   a) L-N mode: the metal oxide varistor 402 is abnormal, and is heated, since it tightly presses against the two-end temperature sensing fuse 401. Finally, the temperature of the metal oxide varistor 402 will burn the two-end temperature sensing fuse 401 to break out. Therefore, the surge protection indicator 602 has no current and then extinguishes.
   b) L-G mode: the metal oxide varistor 702 has abnormality and then heats gradually, since it presses against the two-end fuses 701 and 704, and if the temperature of the two-end temperature sensing fuse 701 is lower, it will burn out first so that no current flows through the surge protection indicator 602 and it then extinguishes, but current still flows to the two-end temperature 415 sensing fuse 704. Finally, the two-end temperature sensing fuse 704 is burned off and no current flows through the metal oxide varistor 702. Therefore, the metal oxide varistor 702 emits no heat.
   c) N-G mode: The metal oxide varistor 703 has abnormality and heats gradually. Since it presses against the two-end temperature sensing fuses 701 and 704 and the two-end temperature sensing fuse 701 has a lower temperature, it will burn off first so that the surge protection indicator 602 has no current and then extinguishes, but current still flows through the two-end temperature sensing fuse 704. Finally, the two-end temperature sensing fuse 704 is burnt to break out and no current flows through the metal oxide varistor 703. Therefore, the metal oxide varistor 703 emits no heat.

(2) The transient/surge absorber is subjected to a high voltage is destroyed instantly
   a) L-N mode: When abnormality occurs, and high voltage remains the metal oxide varistor 402 will short-circuit instantly. Since a large current flows into the first three-end fuse 50, the first three-end fuse 50 heats up and then breaks out. Other than the current path of the metal oxide varistor 402 being broken, the path of the surge protection indicator 602 will also be broken so that the surge protection indicator 602 extinguishes.
   b) L-G mode: When abnormality occurs, and high voltage remains, the metal oxide varistor 702 will short-circuit instantly. Since a large current flows through the first three-end fuse 50, the first three-end fuse 50 heat up instantly and then breaks off. Other than the current path of the metal oxide varistor 702 is broken, the path of the surge protection indicator 602 will be also broken so that the surge protection indicator 602 extinguishes.
   c) N-G mode: L-G mode: When abnormality occurs, and high voltage remains, the metal oxide varistor 703 short-circuits instantly, since a large current flows through the second three-end fuse 80, the second three-end fuse 80 heats up instantly and then breaks out. Other than the current path of the metal oxide vairstor 703 is broken and the path of the surge protection indicator 602 will also be broken so that the surge protection indicator 602 extinguishes.

In summary, other than indicating the abnormalities of the L-N, L-G, N-G surge absorbing devices, the circuit for indicating abnormality of a three-mode surge absorber of a public electric power of the present invention assure that no leakage occurs as it is destroyed in all modes. Besides, herein, the metal oxide varistor is taken as an example of the first and second surge absorbing devices of the present invention, however, the surge absorbing device, such as a gas tube, a transient voltage suppressor or sidactor, etc. may also be used in the present invention. Especially, the three-end fuses 50 and 80 are not limited to a structure of three ends, it is only considered for the sake of convenience. Other fuses, for example, four end fuses or other multiple end fuses can be used for the purpose of the present invention. The type of the three-end fuse is not confined to be a flat, stand or box type. The multiple end fuses employed in the trace of a printed circuit board layout can also be used in the present invention.

The present invention is thus described. It will be obvious that the same invention may be varied in many ways. Such variations are not to be regarded as a departure from the spirit and scope of the present invention, and all such modifications which would be obvious to one skilled in the art are intended to be included within the scope of the following claims.

What is claimed is:

1. A circuit for indicating abnormality of a three-mode surge absorber of a public electric power serially connected to an input end and an output end of a public power supply, said input end having a line input end, a neutral input end, and a ground input end; said output end including a line output end, a neutral output end, and a ground output end for indicating abnormalities of a three-mode surge absorber of a public electric power completely; said circuit for indicating abnormality of a three-mode surge absorber of a public electric power comprising:

a first surge absorbing device coupled to said line input end and said neutral input end for absorbing a surge between said line input end and said neutral input end;

a first three-end fuse coupled to said first surge absorbing device and said line input end for preventing abnormality of parts;

an abnormal indication circuit coupled to said first three-end fuse for indicating the abnormality of three-mode in public power supply;

a second surge absorbing device coupled to said abnormal indication circuit, said neutral input end and said ground input end for absorbing a surge between said neutral input end and said ground input end; and a second three-end fuse coupled to said neutral input end and said second surge absorbing device for preventing the abnormality of parts.

2. The circuit for indicating abnormality of a three-mode surge absorber of a public electric power as claimed in claim 1, wherein said first surge absorbing device comprises:

a two-end temperature sensing fuse having one end coupled to said line input end and another end coupled to a first end of said first three-end fuse; and a surge absorbing device having one end coupled to said line input end and another end coupled to a second end of said first three-end fuse;

wherein when the surge absorbing device has abnormality and then is heated gradually, said two-end temperature sensing fuse will be burnt to break out finally.

3. The circuit for indicating abnormality of a three-mode surge absorber of a public electric power as claimed in claim 1, wherein said abnormal indication circuit comprises:

a resistor having one end coupled to a third end of said first three-end fuse;

a diode having one end coupled to the resistor; and a light emitting diode having one end coupled to a diode, and another end coupled to said second surge absorbing device.

4. The circuit for indicating abnormality of a three-mode surge absorber of a public electric power as claimed in claim 1, wherein said second surge absorbing device comprises:

a first two-end temperature sensing fuse having one end coupled to said abnormal indication circuit and another end coupled to a second end of said second three-end fuse;

a first surge absorbing device having one end coupled to said line output end;

a second surge absorbing device having one end coupled to a second end of said second three-end fuse and another end coupled to another end of said first surge absorbing device; and a second two-end temperature sensing fuse having one end coupled to said second surge absorbing device and another end coupled to said ground output end;

wherein when said first surge absorbing device has abnormality, it will heat gradually and finally said first two-end temperature sensing fuse will burn and then break out; when the second surge absorbing device has abnormality, and heats gradually, said first two-end temperature sensing fuse will burn and then break out, and finally, the second two-end temperature sensing fuse burn and break out.

5. The circuit for indicating abnormality of a three-mode surge absorber of a public electric power as claimed in claim 2, wherein the first and second surge absorber are selected from one of a group containing metal oxide varistors, gas tubes, transient voltage suppresser and sidactor.

6. The circuit for indicating abnormality of a three-mode surge absorber of a public electric power as claimed in claim 4, wherein the first and second surge absorber are selected from one of a group containing metal oxide varistors, gas tubes, transient voltage suppresser and sidactor.

* * * * *